United States Patent Office 3,382,032
Patented May 7, 1968

3,382,032
INHIBITION OF VOLATILIZATION OF VOLATILE ORGANIC COMPOUNDS
Robert P. Cox, Madison, Wis., assignor to Omega Chemicals Corporation, a corporation of Maryland
No Drawing. Filed Dec. 12, 1961, Ser. No. 158,881
18 Claims. (Cl. 21—60.5)

This invention relates to the retardation or suppression of the volatilization of organic liquids and solids and to the resultant nonvolatile compositions. More particularly, this invention relates to the process of retarding volatilization of organic compounds by the addition thereto of small amounts of certain organic esteramines and etheramines and to the nonvolatile compositions so formed.

It has been suggested to employ certain fatty alcohols, such as cetyl and stearyl, which do decrease the evaporation of water to some extent, to inhibit the evaporation of organic liquids such as benzene, styrene, acetone, methanol, etc. It was found that such fatty alcohols actually accelerated evaporation of organic liquids because their surface activity caused a phenomenon known as "wicking" in the composition, i.e., increasing the effective surface area of volatile organic liquid available to evaporate.

Somewhat more success has been achieved with physical methods of volatilization retardation. Such methods include employing special tanks and containers for holding and storing volatile organic material, floating hollow spheres of inert material on the surface of volatile organic liquids, floating a layer of foam on the surface of a volatile liquid, and interposing an incompatible, nonvolatile liquid or solid barrier layer between the organic volatile material to be protected and the atmosphere. All of these methods are clumsy and of extremely limited applicability.

Quite recently, in U.S. Patent 2,764,603, it has been disclosed that the compound N, N-dimethyl-N'-perfluorocaproyl-(propylene-1,3-diamine), in minute proportions, will inhibit the evaporation of volatile hydrocarbons, such as gasoline. While quite effective with gasoline-type hydrocarbons, this compound does not retard volatilization of other common volatile organic compounds. Moreover, in actual operation, it builds up a foam layer at the surface so that the net effect is a physical method of evaporation retardation which is of limited applicability.

Accordingly, it is an object of this invention to provide a chemical method for suppressing the volatilization of highly volatile organic liquids and solids generally.

It is a further object of this invention to render such highly volatile organic liquids stable to volatilization during shipping and storage.

Another object of this invention is the suppression of noxious and otherwise disagreeable odors given off by many highly volatile organic compounds.

Still another object of this invention is the preparation of nonvolatile, stable compositions from highly volatile organic liquids and solids.

Yet another object of this invention is the inhibition of the high flammability and/or explosiveness of many volatile organic compounds.

A further object of this invention is the preparation of nonodorous compositions from normally volatile organic compounds.

Still further, an object of this invention is the preparation of compositions from volatile organic compounds, which compositions are of low flammability and are explosion-stable and hence do not require the stringent precautions presently necessary during handling and storage.

Yet a further object of this invention is to increase the ease an economy of handling and storing highly volatile organic compounds by incorporating therein a small amount of a volatilization retardant which acts to reduce evaporation or sublimation and concomitantly, to suppress odors and to reduce flammability and explosive tendencies.

A specific object of this invention is the production of explosive compositions from normally highly volatile organic compounds by the simple expedient of admixing stable, non-volatile, non-odorous, non-flammable, non-therewith a small amount of a readily available stabilizer selected from a particular group of esteramines and etheramines.

Another specific object of the invention is to render normally highly volatile organic compounds so stable that they can be handled and stored without elaborate precautions by the simple expedient of incorporating therein a small amount of a readily available stabilizer selected from a particular group of esteramine and etheramines.

Other and further objects will appear from the ensuing detailed description.

Generally described, the objects of this invention are attained by the use, as stabilizer and volatilization inhibitor, of an esteramine or etheramine having the general formula

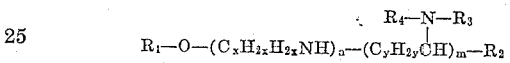

In the formula $R_1$ represents an alkyl or alkacyl radical having from about 8 to about 32 carbon atoms, $R_2$, $R_3$ and $R_4$ each represent hydrogen, lower alkyl, hydroxy (lower alkyl), or any hydrophilic grouping such as

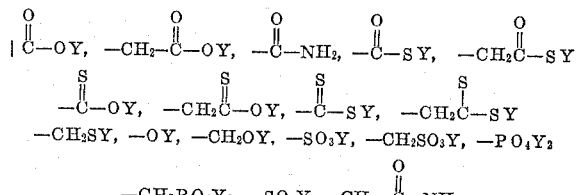

—$CH_2SO_4Y$, —$PO_3Y_2$, —$CH_2PO_3Y_2$, with the single proviso that at least two of $R_2$, $R_3$ and $R_4$ must be hydrogen, lower alkyl or hydroxy (lower alkyl), Y represents hydrogen, lower alkyl or a soluble salt-forming group, e.g., alkali metal, ammonium, morpolinium, pyridinium, etc.

$n$ represents an integer from 1 to 5,
$m$ represents an integer from 0 to 1,
$x$ represents an integer of 1 to 6, and
$y$ represents an integer of 0 to 5.

In the definition of $R_1$, the words "alkyl" and "alkacyl" are intended to include saturated and unsaturated hydrocarbon radicals which contain no more than two double bonds and may, but preferably do not, contain some halogen substitution. If $R_1$ has a value below about 8 carbon atoms, effective inhibition of volatilization is not achieved. The invention contemplates a value for $R_1$ in the range of from about 8 up to about 32 carbon atoms. While it will be recognized that every $R_1$ value is not equally effective with every volatilizable organic compound, $R_1$ values higher than 32 carbon atoms, such as up to 40 or more carbon atoms, are effective in suppressing the volatilization of certain compounds (e.g., the volatile aliphatic hydrocarbons) and the upper limit of $R_1$ is conditioned more upon the availability of compounds embodying radicals higher than $C_{32}$ than upon their efficacy in retarding volatilization.

Among the many suitable $R_1$ radicals are the natural and synthetic fully saturated hydrocarbon radicals and admixtures thereof, the unsaturated natural and synthetic hydrocarbon radicals, the acyl radicals derived from fats, fatty oils, fatty acids, etc., the synthetically produced saturated and unsaturated acyl radicals, etc. To exemplify more specifically, suitable embodiments of $R_1$ include, e.g., octyl, nonyl, decyl, undecyl, dodecyl, tridecyl, cetyl, ceryl, eicosyl, radicals derived from various synthetically produced $C_{20}$ to $C_{32}$ hydrocarbons, octenyl, octadienyl, dodecenyl, dodecadienyl, hypogeyl, hexadecenyl, hexadecadienyl, and the like. Further suitable embodiments of $R_1$ include capryl, lauryl, myristyl, palmityl, stearyl arachidyl, behenyl, lignoceryl, cerotyl, decylenyl, dodecylenyl, palmitoleyl, hentriacontanyl, heptacosyl, octacosyl, hexacosyl, dotriacontanyl, phytadienyl, phytyl, triacontanyl, myricyl, nonacosyl, palmitolyl, brassidyl, ricinoleyl, petroselinyl, vaccenyl, linoleyl, licanyl, parinaryl, tariryl, gadoleyl, arachidonyl, cetoleyl, erucyl, nervonyl, melissyl, pelagonyl, undecanoyl, elaidyl, eleomargaryl, tridecanoyl, pentadecanoyl, margaryl, nondecanoyl, hydnocarpyl, chaulmoogryl, gorlyl, and like radicals. Further examples of $R_1$ include the acyl and/or alkyl mixed radicals derived from various fats and oils, etc., such as sperm oil, cod oil, train oil, pilchard oil, lard oil, neat's-foot oil, olive oil, cottonseed oil, red oil, coconut oil, soybean oil, oiticaca oil, tung oil, linseed oil, corn oil, perilla oil, babassu oil, palm-kernel oil,, castor oil, peanut oil, rapeseed oil, palm oil, tallow, fish oils including whale oil, herring oil, sardine oil, etc., hydrogenated tallow, hydrogenated corn oil, tall oil and hydrogenated tall oil, as well as radicals derived from synthetically produced mixed acids having an average number of carbon atoms in the range of from about 8 to about 32.

In the substituents $R_2$, $R_3$, $R_4$ and Y, when lower alkyl or hydroxy (lower alkyl) is specified, it is intended to embrace any alkyl or hydroxyalkyl radical of 1 to 6 carbon atoms. Particularly preferred substituents in each instance, however, are methyl and ethyl of the lower alkyl radicals and hydroxymethyl and hydroxyethyl of the hydroxy (lower alkyl) groups.

The invention contemplates that any of $R_2$, $R_3$ and $R_4$ may be any known hydrophilic group so long as at least two of $R_2$, $R_3$ and $R_4$ are H, lower alkyl or hydroxy (lower alkyl). The particular hydrophilic groupings set out in detail above are intended to be exemplary rather than limiting and to represent those most readily available.

It is to be understood that when Y represents a soluble salt-forming group as mentioned above that quaternary ammonium radicals are positively excluded from the scope of the definition. Soluble amine salts are within the contemplation of this invention; however, quaternary ammonium derivatives of the presently disclosed inhibitors are to be avoided, not only insofar as Y is concerned, but throughout the inhibitor molecule, since quaternary ammonium compounds generally have been found to be unsatisfactory in accomplishing the objects of this invention.

The amount of additive necessary to achieve the desired result will, of course, vary with the particular organic material to be stabilized and the particular additive employed. Not all inhibitors are equally effective with all volatile organic compounds. In general, the effective amount of inhibitor to be added will be from about 0.005% to about 10% by weight based on the volatile organic material. A preferred range for the stabilizer is from about 0.10% to about 5.0% by weight of the volatile organic material.

Among the numerous voltatile organic materials which have been found to be rendered stable to volatilization by the addition of small amounts of esteramines and ethramines contemplated by this invention are both liquid and solid, polar and non-polar materials. Among the classes of volatile organic materials which can be effectively protected according to this invention are organic aldehydes, ketones, hydrocarbons, nitriles, halogenated compounds, amines, ethers, alcohols, esters, acids, sulfides, amides, phosphines arsines, borines, borates, nitrates, nitrites, acid halides, peroxides, oximes, nitramines, nitrosamines, metal alkyls, isocyanides, isocyanates, etc.

Specific materials which can be rendered non-volatile by treatment according to the invention include glyoxal, isovaleraldehyde, propargyl, aldehyde, pyuvaldehyde, acetaldehyde, acrolein, crotonaldehyde, propionaldehyde, butyraldehyde, benzaldehyde, isobutyraldehyde, dichloroacetaldehyde, chloral, bromal, adipaldehyde, aldol, furfural, tetrahydrofurfural, acetone, methyl ethyl ketone, methyl propyl ketone, methyl vinyl ketone, alpha-bromoacetophenone, viacetyl, methyl isopropyl ketone, toluquinone, naphthoquinone, 2,6-dichloroquinone, and the like. Further volatile compouds which can advantageously be treated according to the invention are, for example: benzene, gasoline, dimethylbutene, methylbutene, ethylbutene, tetramethylethylene, beta-isoamylene, cyclopentadiene, 1,5-hexadiene, 2,4-hexadiene, 2,5-dimethyl-2, 4-hexadiene, 1,5-hexadiene-3-yne, hexenes, methylhexenes, isoprene, heptane, octane, napthalene, styrene, methylstyrene, methylcyclobutane, cyclohexadiene, cyclohexene, cyclohexane, 3-methylbutadiene, 2,3-dimethylbutadiene, biisopropyl, neohexane, isopentane, 2,2,3-trimethylbutane, 3-methylbutyne, cyclopentane, 1,1-dimethylcyclopropane, dodecynes, heptynes, octynes, nonynes, hexynes, acetonitrile, propionitrile, butyronitrile, acrylonitrile, allyl cyanide, crotononitrile, isobutyronitrile, isovaleronitrile, pyruvonitrile, methacrylonitrile, vinyl iodide, methylene chloride, methylene bromide, tetrachlorodifluoroethane, trichlorotrifluoroethane, trichloroethane, tribromoethane, dichloroethylene, perchloroethylene, isopropyl, bromide, isopropyl chloride, allyl iodide, amyl fluoride, benzal fluoride, allyl chloride, ethyl chloride, trichloroethylene, benzyl iodide, bromoform, tertiary-amyl chloride, ethylene dichloride, ethylene dibromide, trichloromonofluoromethane, dichlorobenzene, carbon tetrachloride, isopropyl iodide, diiodoacetylene, allyl bromide, chloroform, chloroprene, alpha-bromostyrene, and the like.

Still further examples include
diethylamine,
dipropylamine,
dibutylamine,
diallylamine,
morpholine,
propylenediamine,
monobutylamine,
trimethylamine,
putrescine,
cadaverine,
allylamine,
amylamine,
N-methylortho-nitroaniline,
tributylamine,
difurfurylamine,
ethoxyethylamine,
ethylenediamine,
isopropylamine,
piperidine,
piperazine,
pipecoline,
picoline,
pyridine,
pyrazine,
pyrimidine,
pyrrole,
ethylpyrrole,
methylpyrrole,
2-quinolinol,
tetrazine,
tetrazole,
tetryl,
trimethylenimine,
amyl nitrite,
butyl nitrite,
secondary butyl nitrite,
tertiary butyl nitrite, isoamyl nitrite,
ethylene nitrite,
formaldoxime,
acetoxime,
ethyl isocyanide,
ethyl nitrate,
azoxybenzene,
ethylenimine,
nitrosobenzene,
diethylnitrosamine,
nitrobenzene,
naphthylamine,
naphthoquinone,
diethylnitramine,
dimethylnitrosamine,
nitroethane,
ethoxyamine,
acetonylurea,
diacetylurea,
dimethylformamide,
melamine,
phenacetin,
acetamide,
ethyl hydrazine,
methylhydrazine,
dimethylhydrazine,
phenylhydrazine,
furfuramide,
betamethylhydroxylamine,
ethyl isocyanate,
isobutyl isocyanate,
isopropyl isocyanide,
isopropyl nitrite,
isopropyl nitrate,
2,6-lutidine,
dinitromethane,
nitromethane,
tetranitromethane,
chloropicrin,
methyl nitrate,
trinitromethane,
nitroglycerine,
nitropropane,
propylnitramine,
dinitrotoluene,
trinitrotoluene,
ethyl isothiocyanate,
methyl isothiocyanate,
methyl thiocyanate,
isoamylthiocyanate,
ethyl borate,
dimethyl sulfoxide,
ethyl sulfoxide,
methyl sulfite,
thiophosgene,
dichloromethylarsine,
diethylarsine,
dimethylarsine,
ethylarsine,
trimethylarsine,
triethylborine,
triisoamylborine,
tripropylborine,
cacodyl chloride,
diethylphosphine,
dimethylphosphine,
triethyl phosphine sulfide,
triethylphosphine,
trimethylphosphine, etc.

Additional volatile compounds whose properties are improved by treatment according to this invention are:
triethyl aluminum,
diethyl cadmium,
diethyl tellurium,
tetramethyl lead,
dimethyl mercury,
methyl mercuric chloride,
diethyl zinc,
dimethyl zinc,
dimethyl selenide,
dimethyl telluride,
triethyl stibine,
trimethyl stibine,
tetramethyl tin,
triisoamyl tin chloride,
acetyl peroxide,
perbenzoic acid,
vinylether,
nitrofuran,
diisopropyl ether,
ethylal,
tetrahydropyran,
diethyl ether,
allyl ethyl ether,
allyl methyl ether,
bis(chloromethyl)ether,
ethyl vinyl ether,
acetal,
dioxane,
furan,
petroleum ether,
propylene oxide,
methylal,
butyl methyl ether,
2-methyldioxolane,
bioxirane,
2-ethoxyethanol,
2-methoxyethanol,
isobutylene oxide,
chlorofuran,
furfuryl chloride,
dimethylfuran,
iodofuran,
methylfuran,
epichlorohydrin,
ethanol,
isopropanol,
butanol,
methanol,
allyl alcohol,
2-nitrobutanol,
ethylvinylcarbinol,
allylmethylcarbinol,
methylvinylcarbinol,
saligenin,
butenol,
trinitrophenol,
trinitrocresol,
2-chloroethanol,
2-fluoroethanol,
3-methyl-3-hexynol,
isoamyl alcohol,
methyl formate,
bornyl acetate,
methyl butyrate,
methyl carbonate,
amyl furoate,
ethyl furoate,
allyl acetate,
ethyl acetate,
methyl salicylate,
vinyl acetate,
isopropyl acetate,
propyl acetate,
isobutyl acetate,
propargyl acetate,
methyl acetate,
ethyl formate,
vinyl formate,
benzyl acrylate, ethyl acrylate,
methyl acrylate,
cyclohexyl acrylate,
trichloromethyl chloroformate,
allyl formate,
cyanoethyl formate,
amyl beta-furylacrylate,
isoamyl isobutyrate,
methyl methacrylate,
ethyl methacrylate,
propyl methacrylate,
ethyl thiolcarbamate,
ethyl thionocarbamate,
butyric acid,
acetic acid,
propionic acid,
the "goat" acids
(i.e., caprylic,
caproic and capric acids),
propargylic acid,
vanillic acid,
salicylic acid,
pyruvic acid,
allylacetic acid,
vinylacrylic acid,
cyanoacetic acid,
bromoacetic acid,
chloroacetic acid,
fluoroacetic acid,
iodoacetic acid,
the various di- and tri- (halo) acetic acids,
thiolacetic acid,
alpha-chloroacrylic acid,
para-hydroxybenzoic acid,
vinylacetic acid,
alpha-ketobutyric,
furoic acid,
isethionic acid,
leucic acid,
maleic acid,
malic acid,
acetyl bromide,
acetyl chloride,
benzoyl bromide,
benzoyl chloride,
acetyl iodide,
acrylyl chloride,
adipyl chloride,
benzenesulfonyl chloride,
butyryl chloride,
carbamyl chloride,
furoyl chloride,
isovaleryl chloride,
oxalyl chloride,
carbon disulfide,
allyl sulfide,
butyl mercaptan,
isoamyl mercaptan,
divinyl sulfide,
thiophene,
tertiary amyl mercaptan,
ethanedithiol,
ethyl mercaptan,
dimethyl sulfide,
diethyl sulfide,
ethylene sulfide,
isopropyl mercaptan,
methyl sulfide,
and like compounds.

In addition to inhibiting the volatilization of simple organic compounds, it is contemplated according to the invention to inhibit the volatilization of volatile ingredients from organic plastics and resinous materials such as, e.g., styrene-modified polyesters. Moreover, the evaporation of mixtures such as volatile oils consisting essentially of volatile terpenes, ketones, aldehydes, alcohols and esters can be inhibited according to this invention. Such oils include oil of angelica, oil of cloves, oil of wintergreen, oil of anise, oil of asarum, oil of caraway, oil of balm, oil of camphor, oil of bitter orange, oil of basil, oil of bay, oil of bergamot, oil of calamus, oil of cajuput, oil of cascarilla, oil of cedar wood, oil of celery, oil of chamomille, oil of peppermint, oil of wormwood, oil of chenopodium, oil of white cedar, oil of champaca, oil of turpentine, oil of cinnamon, oil of citronella, oil of valerian, oil of cherry laurel oil of tansy, oil of sweet bay, oil of copaiba, oil of geranium, oil of coriander, oil of thyme, oil of cubeb, oil of garlic, oil of dill, oil of mountain pine, oil cypress, oil of fennel, oil of cumin, oil of eucalyptus, oil of fir, oil of fleabane, oil of ginger, oil of spike, oil of hops, oil of lemon, oil of spearmint, oil of hyssop, oil of juniper, oil of lavender, oil of savin, oil of nutmeg, oil of lemon grass, oil of marjoran, oil of linaloe, oil of male fern, oil of parsley, oil of sassafras, oil of matico, oil of horsemint, oil of orange, oil of orange flowers, oil niaouli, oil of pepper, angle, oil of orange flowers, oil of niaouli, oil of pepper, oil of rosemary, oil of rose, oil of pimento, oil of rue, oil of santal, oil of pine needles, oil of petitgrain, oil of yarrow, and the like.

Inasmuch as all inhibitors are not equally effective with all volatile organic compounds, it is also possible to design a system in which evaporation or volatilization of one compound will be preferentially retarded or suppressed.

Moreover, as will readily be recognized, numerous desirable side effects occur incidental to the suppression of evaporation or sublimation by the inhibitors of this invention. For example, various inflammable liquids which have previously required elaborate precautions during storage can, when treated with the inhibitors of this invention, be stored in open containers without substantial risk. This will find particular application not only in storage facilities themselves but also in the operation of dry cleaning plants and in de-greasing methods which employ solvents. In addition, it has been found that the effectiveness of dry cleaning and de-greasing solvents is increased concomitant with and incident to the inhibition of their volatilization. It is thus apparent that not only is the safety of the operation greatly increased, but it is rendered far more economical.

Medicinal oils, such as oil of wintergreen and oil of cloves, gain not only increased shelf life by being rendered substantially stable to volatilization, but also are rendered more pleasant to use by reason of the concomitant elimination of their present objectionable odors and are further characterized by enhanced efficacy so that smaller applications will give the same result as previously attained with large and odorous quantities.

Volatile reactive ingredients such as styrene may be maintained in polymerization systems without the use of awkward and complicated special equipment when treated in accordance with this invention. Moreover, styrene-modified resins and polymers can be spray molded on hot forms without substantial loss of volatile ingredients if they are previously pre-treated in accordance with this invention.

Moth repellents, such as naphthalene and dichlorobenzene, will gain increased shelf life and their objectionable oders are reduced to an almost imperceptible point when they are treated in accordance with the invention.

Various liniments and other topically applied substances, e.g., rubbing alcohol, are rendered more efficient, less odorous, and given longer effectiveness by treating them in accordance with the invention.

Various substances which are presently known to be characterized by noxious odors, e.g., isoamyl alcohol, carbon disulfide, mercaptans and alkyl diamines, are not only rendered stable to volatilization but also substantially non-odorous when treated in accordance with the invention. This constitutes a boon to laboratory workers, for many reactions which have previously been difficult or impossible to run without special equipment can now be conducted easily.

It has also been found that loss of volatile organic materials through small leaks in storage systems is substantially eliminated when the volatile materials are treated in accordance with the present invention. For example, in gasoline storage systems, the occurrence of this phenomenon not only eliminates expensive waste of the gasoline but it greatly reduces the ignition danger presently recognized to attend such leaks. This also finds application, inter alia, in automobile radiator systems containing antifreezes and various other storage facilities where small holes have previously caused loss of a substantial portion of volatile material.

In polymerization and other chemical reaction systems employing volatile metal alkyl catalysts, it is possible, by the practice of this invention, to avoid the use of special and expensive equipment and techniques previously used to prevent access of air to the system. It will, of course, be understood that the volatilization inhibitor must be selected in such manner as to preclude the presence of any group that may react with the metal alkyl. It is contemplated, moreover, that the inhibitor be so selected as to constitute an initiator for the polymerization reaction or other reaction to be catalyzed and, hence, to avoid extraneous contaminants in the final product.

Various commonly used materials which ordinarily "dry out," thicken or evaporate completely after being opened can, if treated according to the invention, be given prolonged useful lives. Such materials include, inter alia, shoe polishes and waxes, paints, lacquers, enamels, nail polishes, inks, perfumes colognes, antiseptics, glues, hair tonics and conditioners alcoholic beverages, cosmetic creams and lotions, air fresheners, flavoring agents such as vanilla and lemon extracts, car and furniture waxes, metal polishes, sun lotions and screening agents, pesticidal materials, and the like. It is pointed out that, while such materials as perfumes and colognes which are desired to exhibit a fragrance are rendered stable to volatilization during storage, nevertheless, if, e.g., the bottle is shaken before application to the skin or the substance is sprayed from the bottle, they still retain their desirable aroma. In other words, the practice of this invention inhibits odor only to the extent that it inhibits evaporation; it does not deodorize per se.

Normally volatile materials which are subject to explosion and/or spontaneous ignition when their vapors become admixed with air are, if treated according to this invention, rendered substantially nonvolatile and, hence, relatively safe for ordinary handling and storing. This is exceptionally advantageous insofar as acetylenic compounds, nitro and nitroso compounds, organic nitrates and nitrites and the like are concerned.

The mechanism of the inhibition of volatilization according to this invention is not presently completely understood. It appears, however, that volatilization inhibition according to this invention takes place by a mechanism which is the reverse of Langmuir's theory explaining the inhibition of water evaporation by materials such as fatty acids and fatty alcohols. Thus, Langmuir employed compounds which exhibited a hydrophilic head and a hydrophobic tail, the head being attracted toward the water and the tail being repelled by the water. The molecules of the compound were propelled by these forces to form a layer at the surface of the water with the tail being directed toward the surface, that is, away from the liquid. In the present invention, the inhibitors which have been found to be effective are characterized by having an oleophilic, i.e., hydrophobic tail and an oleophobic, i.e., hydrophilic head. Again, the effect of the these forces acting on the molecules of the inhibitors results in formation by the compound of a barrier layer at the surface with the tail portion of the molecule directed toward the organic liquid and the head portion of the molecule being directed away from the organic liquid, that is, toward the surface of the liquid. Thus, the apparent result is a formation of a double interlocking barrier layer or "molecular sheath" which exhibits a "microcrystalline" behavior and is most effective in inhibiting volatilization, even though the orientation of the head and tail portions of the molecule is the reverse of that which Langmuir and subsequent workers found effective in inhibiting volatilization of water. Despite the fact that in order to inhibit evaporation of water it has been found desirable to form a barrier layer with the tail portion of the molecule oriented toward the surface in order to prevent the evaporation of an organic liquid, it now appears that a double barrier layer wherein the head is oriented toward the surface and the tail away from it is far more efficient and beneficial.

This phenomenon is also contrary to that observed by Ahlbrecht (U.S. Patent 2,764,602) with perfluoro amido amines, in that the perfluoro alkyl tail is both hydrophobic and oleophobic and instead of orienting at the surface of the volatile compound and, apparently, forming a strong bond therewith by some presently unappreciated mechanism, this tail initially orients over the surface. In action, moreover, the Ahlbrecht compounds foam at the surface and produce a physical, rather than a chemically oriented, barrier. Hence, its action is, in general, not as strong as that achieved by the formation of a double-barrier layer or molecular sheath in accordance with this invention. This hypothesis is in no way intended to be limiting. It represents what appears to be the most likely mechanism of the observed phenomena, but this has not been experimentally provided. It is thus submitted as a probable explanation rather than an absolute truism. While the theory is elucidated above with reference to volatile organic liquids, it applies equally to volatile organic solids and it is to be understood as intended to do so.

The barrier layer or molecular sheath formed at the surface of the volatile organic compound according to this invention can be disrupted by mechanical agitation, the effect of wind, ultrasonic vibration, spraying and similar forces. Immediately upon cessation of agitation, however, the molecular sheath re-forms on the surface and continues to protect the volatile compound.

When volatile organic liquids having refrigerant properties are treated in accordance with this invention, it is possible by judicious application of mechanical agitation to achieve a highly efficacious and economical mechanical refrigeration process.

Similarly, when volatile organic corrosion inhibitors for metals, e.g., nitrites, sulfides, etc., are treated in accordance with the invention, their action can also be mechanically controlled by judicious application of mechanical agitation.

When the volatile material to be protected is a relatively polar water-soluble organic liquid, the effectiveness of a given additive in inhibiting volatilization appears to depend to some extent upon the relative humidity of the atmosphere. On a dry day, the ester of hydroxy diethylene diamine and a $C_{15}$ to $C_{17}$ acid gives excellent results with methanol, but on a humid day, the same additive is less effective. It appears that a surface solution of water and polar liquid is formed in the presence of humidity and that this, at least to some extent, disrupts the action of the molecular sheath upon the surface of the volatile compound. In contradistinction, the results with volatile non-polar liquids such as benzene, carbon tetrachloride, diethyl ether, etc., are independent of humidity and are reproducible no matter what the atmospheric conditions.

Having generally described the invention, the following examples are given by way of specific illustration:

Examples 1 and 2

Two alkyl etheramines of the general formula R—O—$CH_2CH_2CH_2NH_2$ were employed in these examples. Both were obtained from Archer-Daniels-Midland Company under the respective designations Alkyl Etheramine #1 and Alkyl Etheramine #3. In #1, R is an alkyl radical derived from coco fatty acids having the following analysis

| | Percent |
|---|---|
| Caprylic | 8 |
| Capric | 7 |
| Lauric | 48 |
| Myristic | 17.5 |
| Palmitic | 8.2 |
| Stearic | 2 |
| Oleic | 6 |
| Linoleic | 2.5 |

In #3, R is an alkyl radical derived from hydrogenated tallow having the analysis 2% myristic, 32.5% palmitic and 65.5% stearic.

In each experiment, 0.1 gram of the alkyl etheramine were added to 9.9 grams of benzene and placed in an open cup having a cross-sectional area of 4 sq. in. Ten grams of unmodified benzene were placed in an identical open cup and all were left exposed to the atmosphere under ambient conditions. The amounts of benzene remaining after 4½, 5½ and 24 hour intervals were determined by weighing.

| Example | Composition | Percent of Original Weight Lost at — | | |
|---|---|---|---|---|
| | | 4½ hrs. | 5½ hrs. | 24 hrs. |
| 1 | Alkyl Etheramine #1 plus Benzene. | (¹) | 15 | 50 |
| 2 | Alkyl Etheramine #3 plus Benzene. | 10 | (¹) | 26 |
| Control | Unmodified Benzene | 100 | | |

¹ No weighing.

Examples 3 and 4

Stearic acid was reacted with (1) excess ethanolamine and (2) n-propanolamine to yield products believed to be, respectively:

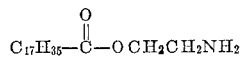

and

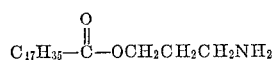

Each of these products was tested as a volatilization inhibitor for benzene in the manner set forth in Examples 1 and 2 above. The evaporation rates per hour per square inch of surface area were calculated from data obtained by periodic weighing of the cups. They are as follows:

| Example | Composition | Evaporation Rate, grams/hour/sq. in. exposed |
|---|---|---|
| 3 | Aminoethyl Stearate plus Benzene | 0.34 |
| 4 | Aminopropyl Stearate plus Benzene | 0.18 |
| Control | Unmodified Benzene | 0.625 |

Examples 5–28

Using the method given in Examples 1 and 2, Alkyl Etheramines #1 and #3, aminoethyl stearate and aminopropyl stearate were tested as volatilization inhibitors with each of methanol, isopropanol, diethyl ether, petroleum ether, toluene, and styrene, and the evaporation rates of both the modified and unmodified solvents were determined. The results, calculated as the ratio of the evaporation rate of the pure liquid to that of the modified material, are set forth below:

| Examples | Volatile Liquid | Ratio of Evaporation (Pure Liquid Modified Liquid) | | | |
|---|---|---|---|---|---|
| | | Alkyl Etheramine #3 | Alkyl Etheramine #1 | Aminoethyl Stearate | Aminopropyl Stearate |
| 5 to 8 | Methanol | 3.2 | 3.5 | 6.0 | 5.0 |
| 9 to 12 | Isopropanol | 5.9 | 5.0 | 6.5 | 5.0 |
| 13 to 16 | Diethyl Ether | 10.5 | 7.1 | 5.7 | 6.1 |
| 17 to 20 | Petroleum Ether | 4.3 | 2.8 | 2.1 | 3.05 |
| 21 to 24 | Styrene | 9.5 | 9.0 | 7.6 | 8.5 |
| 25 to 28 | Toluene | 11.5 | 8.5 | 7.0 | 7.5 |

It is to be understood that the additives of this invention may be employed in dry cleaning solvents and degreasers, with styrene-modified polyester resins, with refrigerant liquids, with moth-proofing agents, with medicinal oils, etc., in the same manner as shown in the specific examples of my copending concurrently filed application, Ser. No. 158,863, filed Dec. 12, 1961. In view of the multiplicity of examples there shown and the similarity of operation insofar as the use of additives is concerned, it is deemed unnecessary to present similar examples for each additive shown herein.

What is claimed is:

1. A method of inhibiting the volatilization of normally volatile organic substances which comprises adding thereto from about 0.005% to about 10% by weight of a volatilization inhibitor having the general formula

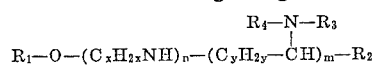

in which $R_1$ is selected from the group consisting of alkyl and alkacyl radicals having from about 8 to about 32 carbon atoms, two of $R_2$, $R_3$, and $R_4$ are selected from the group consisting of hydrogen, lower alkyl and hydroxy (lower alkyl), the other of $R_2$, $R_3$ and $R_4$ is selected from the group consisting of hydrogen, lower alkyl, and hydrophilic groups, $n$ is an integer of from 1 to 5, $m$ is an integer of from 0 to 1, $x$ is an integer of from 1 to 6, and $y$ is an integer of from 0 to 5.

2. The method of claim 1 wherein one of $R_3$ and $R_4$ is an organic hydrophilic radical selected from the group consisting of

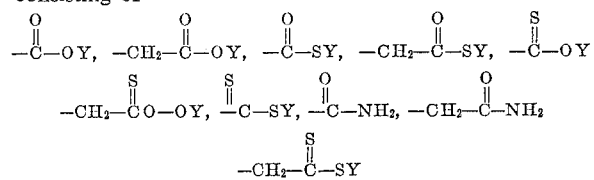

—SY, —CH₂—SY, —CH₂OY, —OY, —SO₃Y, —CH₂SO₃Y, —PO₄Y₂, —CH₂PO₄—Y₂, —SO₄Y, —CH₂SO₄Y, —PO₃Y₂ and —CH₂PO₃Y, and Y is selected from the group consisting of hydrogen, a lower alkyl radical, and a water soluble salt-forming group.

3. The method of claim 1 in which the inhibitor is added in an amount of from about 0.10% to about 5% by weight.

4. The method of claim 1 wherein the normally volatile organic substance is selected from the group consisting of benzene, methanol, isopropanol, diethyl ether, petroleum ether, styrene and toluene.

5. The method of claim 1 wherein the volatilization inhibitor is an aminoalkyl ester of a fatty acid.

6. The method of claim 5 wherein the volatilization inhibitor is aminoethyl stearate.

7. The method of claim 5 wherein the volatilization inhibitor is aminopropyl stearate.

8. The method of claim 1 in which the volatilization inhibitor is R—O—$C_xH_{2x}NH_2$, R is an alkyl radical of from about 8 to about 32 carbon atoms, and $x$ is an integer of 1 to 6.

9. The method of claim 8 in which R is an alkyl radical derived from coco fatty acids and $x$ is 3.

10. The method of claim 8 in which R is an alkyl radical derived from hydrogenated tallow and $x$ is 3.

11. The method of claim 8 in which R is an alkyl radical derived from lauric acid and $x$ is 2.

12. The method of claim 8 in which R is an alkyl radical derived from stearic acid and $x$ is 3.

13. The method of claim 8 in which R is an alkyl radical derived from palmitic acid and $x$ is 2.

14. The method of claim 1 in which the normally volatile organic substance is a mixture of organic compounds.

15. The method of claim 14 in which the normally volatile organic substance is a volatile oil.

16. The method of claim 14 in which the normally volatile organic substance is an organic synthetic resin containing at least one volatile ingredient.

17. The method of claim 16 in which the resin is a polyester containing a styrene modifier.

18. A method of inhibiting the volatilization of normally volatile organic substances which comprises adding thereto from about 0.005% to about 10% by weight of a volatilization inhibitor having the general formula

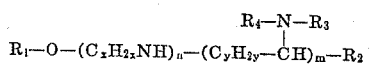

in which $R_1$ is selected from the group consisting of alkyl and alkacyl radicals having from about 8 to about 32 carbon atoms, two of $R_2$, $R_3$, and $R_4$ are selected from the group consisting of hydrogen, lower alkyl and hydroxy (lower alkyl), the other of $R_2$, $R_3$ and $R_4$ is selected from the group consisting of hydrogen, lower alkyl, hydroxy (lower alkyl) and hydrophilic groups, $n$ is an integer of from 1 to 5, $m$ is an integer of from 0 to 1, $x$ is an integer of from 1 to 6, and $y$ is an integer of from 0 to 5, said lower alkyl groups containing from 1 to 6 carbon atoms.

References Cited
UNITED STATES PATENTS

| | | | |
|---|---|---|---|
| 2,372,624 | 3/1945 | Carpenter | 260—584 |
| 2,151,788 | 3/1939 | Mauersberger | 260—404 |
| 2,391,831 | 12/1945 | Jayne et al. | 260—404.5 |
| 2,764,602 | 9/1956 | Ahlbrecht | 260—404.5 |
| 2,764,603 | 9/1956 | Ahlbrecht | 252—51 X |
| 3,036,880 | 5/1962 | Malkemus | 21—60.5 |

MORRIS O. WOLK, *Primary Examiner.*

WILLIAM H. SHORT, MORRIS LIEBMAN, *Examiners.*

J. ZATARGA, L. T. JACOBS, J. A. KOLASCH,
*Assistant Examiners.*